United States Patent
Sharifi Mehr

(10) Patent No.: US 11,595,372 B1
(45) Date of Patent: Feb. 28, 2023

(54) DATA SOURCE DRIVEN EXPECTED NETWORK POLICY CONTROL

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 520 days.

(21) Appl. No.: 15/688,508

(22) Filed: Aug. 28, 2017

(51) Int. Cl.
*H04L 29/06* (2006.01)
*H04L 9/40* (2022.01)
*G06F 21/33* (2013.01)
*H04L 47/20* (2022.01)
*H04L 43/04* (2022.01)
*H04L 41/0893* (2022.01)

(52) U.S. Cl.
CPC ........ *H04L 63/0807* (2013.01); *G06F 21/335* (2013.01); *H04L 47/20* (2013.01); *H04L 63/0227* (2013.01); *H04L 63/20* (2013.01); *H04L 41/0893* (2013.01); *H04L 43/04* (2013.01); *H04L 63/102* (2013.01)

(58) Field of Classification Search
CPC ......... H04L 63/08; H04L 63/10; H04L 63/20; H04L 63/0807; H04L 63/0893; H04L 63/102; H04L 63/0227
See application file for complete search history.

(56) References Cited

U.S. PATENT DOCUMENTS

| | | | | |
|---|---|---|---|---|
| 8,239,953 B1* | 8/2012 | Satish | ............ | H04L 63/105 726/1 |
| 8,887,144 B1* | 11/2014 | Marr | ............ | G06F 8/65 717/168 |
| 9,258,312 B1* | 2/2016 | O'Neill | ............ | H04L 63/10 |
| 9,602,482 B1* | 3/2017 | Roth | ............ | H04L 63/107 |
| 2002/0138578 A1* | 9/2002 | Zhou | ............ | H04L 29/12009 709/206 |
| 2006/0059548 A1* | 3/2006 | Hildre | ............ | H04L 9/006 726/9 |

(Continued)

OTHER PUBLICATIONS

Xiang Wang et al., Efficient Network Security Policy Enforcement With Policy Space Analysis, Oct. 2016, ACM, vol. 24, Issue 5, pp. 2926-2938. (Year: 2016).*

(Continued)

*Primary Examiner* — Luu T Pham
*Assistant Examiner* — Fahimeh Mohammadi
(74) *Attorney, Agent, or Firm* — Nicholson De Vos Webster & Elliott LLP

(57) ABSTRACT

Techniques for data source driven expected network policy control are described. A policy enforcement service receives, from a compute instance in a virtual network implemented within a service provider system, a request to access data. The policy enforcement service determines that a virtual network security condition of a policy statement is not satisfied. The policy statement was configured by a user for use in controlling access to the data. The virtual network security condition defines a condition of the virtual network that is to be met. The policy enforcement service performs one or more security actions in response to the determination that the virtual network security condition of the policy statement is not satisfied.

20 Claims, 11 Drawing Sheets

(56) References Cited

U.S. PATENT DOCUMENTS

| | | | | |
|---|---|---|---|---|
| 2006/0070114 A1* | 3/2006 | Wood | ............... | G06F 21/34 |
| | | | | 726/2 |
| 2010/0100924 A1* | 4/2010 | Hinton | ............... | G06F 21/10 |
| | | | | 726/1 |
| 2011/0261828 A1* | 10/2011 | Smith | ............... | H04L 49/70 |
| | | | | 370/401 |
| 2011/0276912 A1* | 11/2011 | King | ............... | G06Q 10/00 |
| | | | | 715/771 |
| 2012/0066763 A1* | 3/2012 | McHugh | ............... | H04L 63/20 |
| | | | | 726/22 |
| 2013/0047240 A1* | 2/2013 | Radhakrishnan | ..... | H04L 63/105 |
| | | | | 726/9 |
| 2013/0152076 A1* | 6/2013 | Patel | ............... | G06F 9/45558 |
| | | | | 718/1 |
| 2014/0082699 A1* | 3/2014 | Eicken | ............... | G06F 21/53 |
| | | | | 726/4 |
| 2014/0282990 A1* | 9/2014 | Engelhart | ............... | H04L 63/08 |
| | | | | 726/9 |
| 2015/0163158 A1* | 6/2015 | Ryland | ............... | H04L 47/70 |
| | | | | 709/225 |
| 2016/0308852 A1* | 10/2016 | Coxe | ............... | G06F 21/31 |
| 2017/0070504 A1* | 3/2017 | Ramachandran | ....... | H04L 63/20 |
| 2018/0182802 A1* | 6/2018 | Tange | ............... | H01L 21/76846 |

OTHER PUBLICATIONS

Santosh Kumar Majhi et al., A Security Enforcement Framework for Virtual Machine Migration Auction, Oct. 2015, ACM, pp. 47-53. (Year: 2015).*

Padmalochan Bera et al., Generating Policy based Security Implementations in Enterprise Networks—A formal framework, Oct. 2010, ACM, pp. 1-8. (Year: 2010).*

Eric Yuan et al., Attributed Based Access Control (ABAC) for Web Services, Nov. 14, 2005, IEEE, pp. 1-9. (Year: 2005).*

* cited by examiner

DATA SOURCE DRIVEN EXPECTED NETWORK POLICY CONTROL

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to provide those services is dynamically scalable to meet the needs of the services at any given time. A user or customer often will rent, lease, or otherwise pay for access to resources provided in a service provider's system, and thus does not have to purchase and maintain the underlying hardware and/or software.

In this context, many cloud computing service providers utilize virtualization and multi-tenant architectures to allow multiple users to share its underlying hardware and/or software resources. Virtualization allows server end stations, storage devices, or other hardware resources to be partitioned into multiple isolated instances that can be assigned to and used by different users. Thus, multiple users can utilize the cloud computing provider's resources at a time, increasing the number of users a service provider can support, thus reducing the management and financial costs to both the service provider and its users.

However, with the shared use of such computing resources, there is a potential that data or code—which may be highly-sensitive—from one user could potentially be exposed to other users or even to the world at large. Such data leakage could occur due a variety of reasons, ranging from sophisticated computer attacks to malware infections to simple misconfigurations on the part of the users.

BRIEF DESCRIPTION OF DRAWINGS

Various embodiments in accordance with the present disclosure will be described with reference to the drawings, in which.

DETAILED DESCRIPTION

Figure 1:
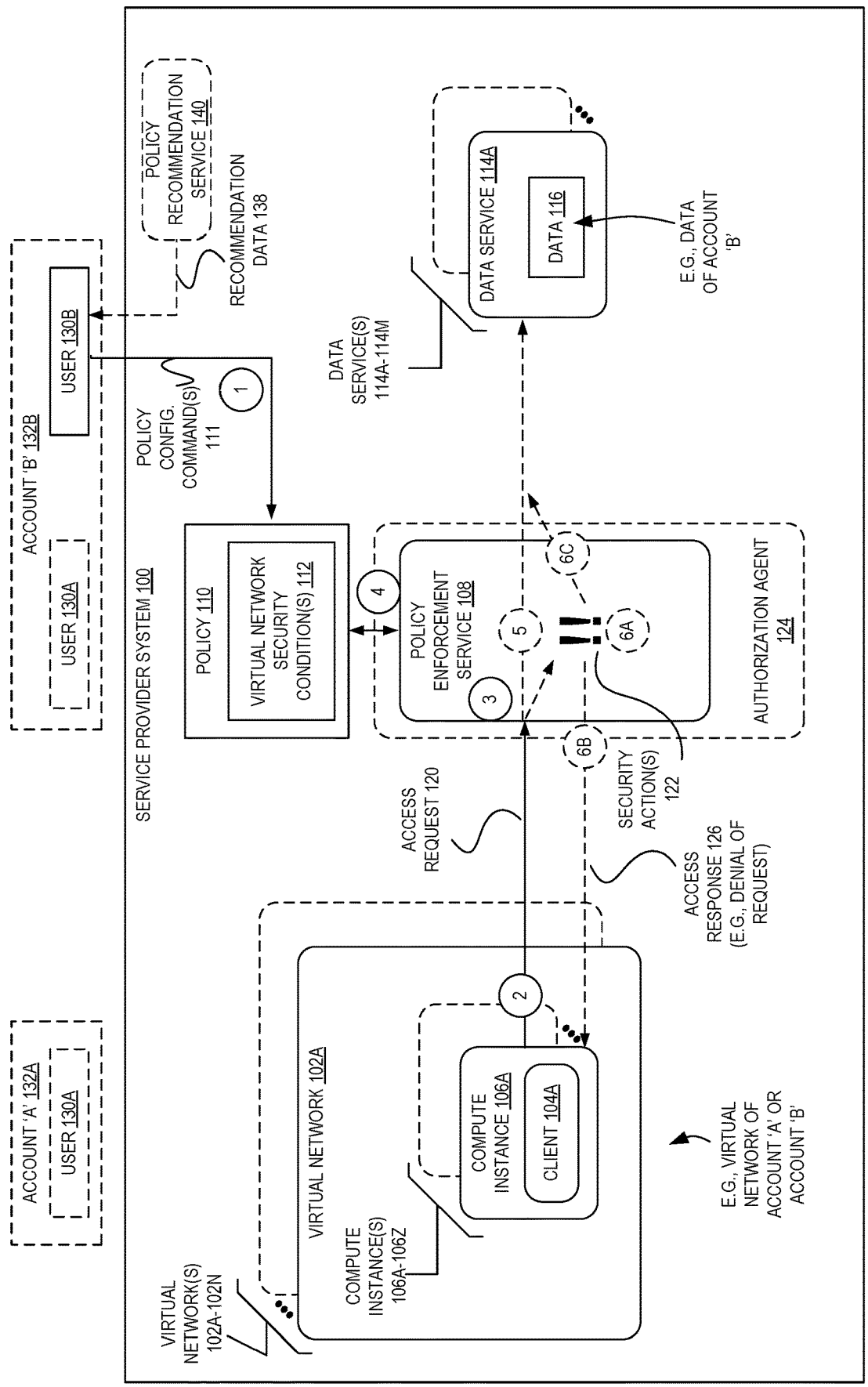
FIG. 1 is a block diagram illustrating a service provider system utilizing data source driven expected network policy control according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A-102N, 106A-106Z) may be used to indicate that there can be one or multiple instances of the referenced entity in some embodiments, though these multiple instances do not need to be identical but instead share some general traits or act in common ways. Further, the particular suffixes used are not meant to imply that a particular amount of the entity exists unless specifically indicated to the contrary, and thus two entities using common suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Modern service provider systems provide users with the ability to utilize one or more of a variety of types of resources such as computing resources (e.g., executing virtual machine (VM) instances and/or containers, executing batch jobs, executing code without provisioning servers), data/storage resources (e.g., object storage, block-level storage, data archival storage), networking resources (e.g., configuring virtual networks including compute resources, content delivery networks, Domain Name Service (DNS)), application resources (e.g., databases, application build/deployment services), etc.

In some service provider systems, it is common for users to utilize several of these types of resources together. For example, a user seeking to perform large-scale data processing may utilize data resources (e.g., to store data) and computing resources (e.g., to access and analyze/transform the data). Some or all of these resources might belong to the user, another user of a same account, or another user of a different account.

It is possible for different users to perform cross-account activities involving their resources. These users may be a part of different entities. An entity may be a formal or informal organization such as a business, non-profit, governmental unit, educational group, shared-interest group, union, collective, etc., and thus the user may act on behalf of (or as part of) the entity. Thus, within the context of the service provider system, an entity may establish an account (or possibly multiple accounts), where each account is associated with one or more users (or "user accounts"). Thus, it is possible for a first user of a first account of a first entity, and a second user of a second account of a second entity, to configure their respective resources to inter-operate. For example, a first user acting on behalf of a small business may store business data within a storage resource of a service provider system, and may wish to have a second user acting on behalf of a data processing or business services company to be able to access the business data via a computing resource to perform some desired task (e.g., analyze the business data to provide reports or insights into the business data, perform accounting services, manage or organize contractual data).

In such cross-account scenarios, it can be important for the user storing data via a storage resource to ensure that the data is properly secured. For example, it could be the case that this data includes sensitive information such as personally-identifying information, financial information, secret or confidential information, etc., and thus the storing user would want to ensure that this data is not exposed any further than to the resources of the cooperative user's account(s). Likewise, even in some intra-account (or intra-entity) scenarios, it can also be useful to ensure that data is properly secured to its inadvertent disclosure, misuse, etc.

To this end, there are techniques for securing storage resources in service provider systems, such as limiting which clients are able to access the stored data (e.g., via whitelisting and/or blacklisting of allowed clients), disabling unneeded aspects/options of the data service storing the data (e.g., closing ports, disabling protocols), enabling authentication and/or authorization systems for the data service, etc.

However, these types of security techniques are typically enabled specifically for that user's resources and thus, a problem may arise in that the resources of the other user are not affected by the user's desired security settings. As a result, even though the data owner may implement excellent security measures, users that are granted access to the data may not have properly secured their own resources, leading to an increased likelihood of data loss or theft.

Some practical approaches could be used to attempt to rectify this problem. For example, the two users (or entities) could attempt to create a legal contract between the two indicating what security measures must be used; however, even if both parties to the contract are willing to enter into the contract, the "data owner" user still cannot be completely certain that the other user (e.g., a "data processing" user) has in fact secured their resources. For example, a data owner may want the other user, who utilizes a compute instance resource to perform data processing, to lock down the compute instance so that it is unable to communicate with any other endpoints (aside from the data resource of the data owner), to keep the software (e.g., Operating System, packages) up to date, to not have particular ports open or use particular protocols, to operate the compute instance in a virtual network that doesn't include any other compute instances, etc. Despite the existence of a contract, it may be impossible for the data owner to ensure that the data processing user is in fact adhering to these requirements.

As another example, the data owner could be granted some type of access to view the security-related configuration of the other resource—e.g., via a privilege-restricted audit account for the resource at the service provider system, or more informally by observing the other user configure their resource (e.g., be present in a same room and view a same screen). For example, a data owner could build some sort of detective system to continuously scan the virtual networks and/or compute instances of the data owner to ensure that the required security controls are in place. Unfortunately, this solution does not work well at scale, especially when there are multiple data processing users and these processing networks are operated by different entities than the data owners. As a result, the data owner may have insufficient visibility and control over the security configuration of the networks accessing its data. Moreover, some entities are not willing to provide such access to its resources, the logistics involved can be problematic, and a burden is placed on the data owner to continually check the security status of the other user's resources as it can change over time, especially when organizations grow rapidly. Further, even if the data owner does frequently monitor the security posture of the other user's resources, it is possible that the other user may not adhere to the requirements for a brief period of time—e.g., when not being monitored by the data owner—in which a security requirement may be not adhered to, possibly leading to data leakage, the introduction of a security threat (e.g., malware), etc.

Accordingly, embodiments for data source driven expected network policy control are described that can allow a user to require another user to adhere to a particular security posture in order to successfully gain access to the user's data. In some embodiments, a user (or "data owner") utilizing a data service of a service provider system to store data can cause the service provider system to allow another user (or even the same user) access to the data only when the requesting user's virtual network and/or resources within the virtual network conform to a particular security posture. In some embodiments, the user configures one or more virtual network security conditions of a policy to identify one or more security requirements for a virtual network and/or resources therein. The policy is evaluated by a policy enforcement service of the service provider system that controls access to the data. In some embodiments, upon receipt of a request to access the data, the policy enforcement service determines whether the one or more virtual network security conditions are satisfied and thus, whether to allow the request to be fulfilled by the data service or whether to perform one or more security actions, such as blocking or throttling the request. As used herein, references to virtual network security conditions are made to generally refer to both conditions directly involving virtual network aspects/operations as well as conditions for other services/resources associated with a virtual network—e.g., one or more compute instances that are part of the virtual network, firewalls used in (or for) the virtual network, etc.

In some embodiments, the policy enforcement service determines a security posture related to the current and/or previous configuration of the calling user's resources by analyzing security data (e.g., tokens) provided with the request. The security data is obtained by the client of the calling user, and is generated by another system that is external to the user's virtual network and possibly external to the service provider system. The security data is indicative of a current and/or previous security posture of the user's virtual network and/or the resources within the virtual network.

In some embodiments, the policy enforcement service determines a security posture related to the current and/or previous configuration of the calling user's resources by obtaining security data from other systems or services, such as a virtual network control system and/or virtual network verification service of the service provider system, that identifies current and/or historic security information regarding the calling user's resources.

Accordingly, embodiments allow users to configure a customizable access policy based on virtual network security conditions to implement robust security controls for data by being able to guarantee that a calling user's resources adhere to current and/or previous security requirements stipulated by the data owner. Thus, a variety of technical benefits result depending upon the implementation, including but not limited to increased system security, reduced data leakage, increased system scalability, etc.

FIG. 1 is a block diagram illustrating a service provider system 100 utilizing data source driven expected network policy control according to some embodiments. The service provider system 100 may implement one or more virtual networks 102A-102N, where each may include one or more compute instances 106A-106Z and other resources (e.g., virtual gateways or other virtual network devices). The service provider system 100 may also implement one or more data services 114A-114M.

In FIG. 1, the service provider system 100 includes a policy enforcement service 108 that evaluates one or more virtual network security conditions 112 of a policy 110 to control access to data 116 (of account 'B' 132B or user 'B' 130B) stored at a data service 114A.

In some embodiments, the policy 110—and specifically, the virtual network security condition(s) 112—is configured (e.g., by a user 130B or account 132B serving as the data owner of data 116) to be applied to control access to a resource—i.e., data 116 of data service 114A. The user 130B may be a person operating for the benefit of (or otherwise associated with) an entity, though the user 130B can also be an individual with no such affiliations.

The user 130B may use a non-illustrated electronic device (e.g., a client end station, server end station) to issue one or more policy configuration commands 111 (e.g., as an Application Programming Interface (API) call) at circle '1' to a policy management service or API endpoint (not illustrated) of the service provider system 100. In some embodiments, the one or more policy configuration commands 111 identify or indicate data values, conditions, and/or settings that are to be used in a policy 110 to control access to a particular resource. For example, the user 130B may utilize the electronic device to view a website or application providing a portal (or "management console") that allows the user 130B to manage or control one or more resources provided by a service provider system 100. The user 130B may interact with the website or application (e.g., using some sort of user input/output component of the electronic device) to launch, modify/configure, or terminate a resource such as a compute instance (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), virtual network instance, data service instance, etc., or to manage resources of the user by, for example, configuring a policy 110 that indicates how access to a resource (e.g., data 116 of data service 114A) is to be controlled. For the example, the user 130B may be presented a user interface on a webpage allowing the user 130B to select a preconfigured policy to be enabled (e.g., via a checkbox or button), create or modify a custom policy (e.g., via a "textarea" HyperText Markup Language (HTML) element) to be enabled, etc. In the case the user 130B is attempting to configure (add, remove, modify, etc.) such a policy 110, the user 130B may "submit" a webpage form (e.g., by selecting a button or link), causing the electronic device to transmit policy configuration commands 111 to the policy management service that may identify the resource(s) to be protected and what conditions, for a received request to access the resource(s), would result in the request being blocked, allowed, throttled, etc.

The policy configuration commands 111 can be of a variety of formats and types based on the particular implementation of the policy management service and/or service provider system 100. In some embodiments, the policy configuration commands 111 are HyperText Transfer Protocol (HTTP) request messages sent to an API endpoint of a service provider's system 100, though many other types of commands can be utilized in other embodiments that are well-known to those of skill in the art. In some embodiments using an API, the API is a REpresentational State Transfer (REST) (or "RESTful") web service and thus the policy configuration commands 111 may adhere to a set of uniform, predefined stateless operations.

Upon receipt of the policy configuration command(s) 111, the policy management service (or API endpoint) causes the policy 110 to be applied to control access to the data service 114A, which can include storing the policy 110 on/in a storage medium, providing the policy 110 to other entities within the service provider system 100, etc.

In some embodiments, the user 130B (via an electronic device) defines a policy 110 including one or more virtual network security conditions 112. For example, a user 130B may define a policy including one or more policy statements. A policy statement is used by the policy enforcement service 108 to control (e.g., allow, deny, throttle) access to some service(s)/resource(s), and can be attached to one or more users, groups of users, or user roles. For example, a policy statement could be "attached to" (or "defined for") a first user (e.g., user 130A) that indicates that this user 130A has permission to perform a particular action (e.g., read and/or write data) for a particular resource (e.g., data 116 of data service 114A).

In some embodiments, the user 130B is provided a set of one or more recommendations via a policy recommendation service 140 as to what type or types of policy elements (e.g., virtual network security conditions 112) may be useful for the user 130B. For example, in some embodiments the user 130B utilizes a web application or other application to configure a policy 110, and the policy recommendation service 140 provides recommendation data 138 to the user 130B indicating one or more virtual network security conditions that the user 130B might find useful based on a level of security the user desires. For example, in an example embodiment, a user can select between different security levels (e.g., "low", "medium", "high") that the user desires to implement, and the policy recommendation service 140 can provide recommendation data 138 indicating different amounts and/or types of virtual network security conditions 112 to implement corresponding degrees of security (e.g., according to defined sets of "low" virtual network security conditions 112, etc.). In some embodiments, the policy recommendation service 140 can determine and provide recommendation data 138 in other ways—e.g., monitoring the data service 114A or data 116 to detect particular patterns of use or commonly-occurring traits and identifying virtual network security conditions 112 that capture one or more aspects of these patterns, determining whether the user 130B (or account 132B) utilizes a particular security service and recommending that a virtual network security condition be used that is based on data generated by the security service, etc.

Figure 2:
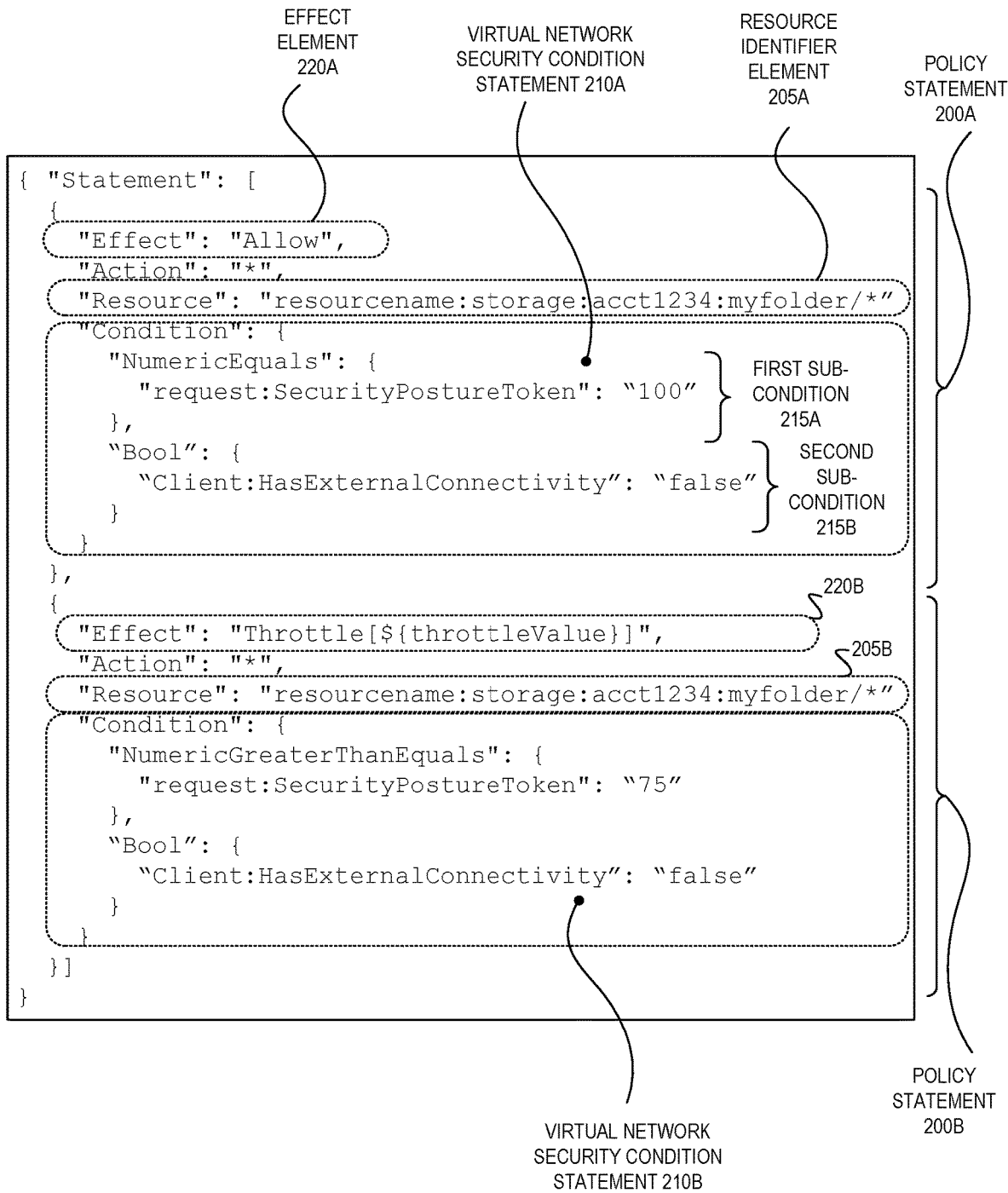
FIG. 2 illustrates exemplary policy statements including virtual network security condition statements for data source driven expected network policy control according to some embodiments.

Two exemplary policy statements 200A-200B are shown in FIG. 2. Both of the exemplary policy statements 200A-200B include a compound virtual network security condition statement 210A-210B for data source driven expected network policy control according to some embodiments. Although this example shows two virtual network security condition statements 210A-210B (of two policy statements 200A-200B), in some scenarios a policy can include fewer (e.g., 1) or more (e.g., 3+) policy statements 200A-200B, virtual network security condition statements 210A-210B, sub-conditions (e.g., sub-conditions 215A-215B), etc. Additionally, the particular grammar used to define policies and/or policy statements can be implemented in many different ways (as is known by those of skill in the art); thus, the example grammar is illustrative and not limiting.

The first illustrated policy statement 200A includes an "effect" of "allow" and an action of "*" (indicating that a request with any type of requested action—such as reading a file, listing contents of a folder/bucket, deleting a file—is to be allowed, as opposed to other possible effects such as "allow" indicating a request is to be allowed) for a resource identified by resource identifier element 205A when a corresponding one or more conditions of the policy statement 200A (indicated by the virtual network security condition statement 210A) are satisfied. In this example, the resource identifier element 205A includes an identifier of a particular set of one or more resources—any data stored within a folder entitled "myfolder" that is owned by an account having an account identifier of "acct1234." Of course, this representation is exemplary, and thus many other resource identifiers and/or resource identifier elements 205A are used in other embodiments.

The virtual network security condition statement 210A defines two sub-conditions 215A-215B that together indicate a required security posture that must be adhered to by a client seeking to access the identified resource in order for the request to be allowed (per effect element 220A). As illustrated, each of the sub-conditions 215A-215B must be satisfied for the overall virtual network security condition statement 210A to be satisfied (e.g., as an "AND" of the two sub-conditions), though in other embodiments the sub-conditions could be evaluated in other ways (e.g., as an OR).

In this example, a first sub-condition 215A indicates that, for a request to access the resource to be allowed, a "SecurityPostureToken" token value is to be a numeric value that is equal to 100 (per the condition type "NumericEquals" and the value of "100"). As will be described in further detail later herein, in some embodiments a token is generated that includes one or more values that describe or identify a current and/or previous security posture associated with the calling user's virtual network. In some embodiments, such a token is acquired by the calling client and provided with or within an access request as security data. In this depicted example, if the value of a token with an identifier of "SecurityPostureToken" (e.g., a value that is a "security score" indicating an amount of adherence to a set of security standards from the perspective of a security service) is exactly "100," a request to access the resource may be allowed, provided that the other sub-condition 215B is also satisfied.

The second sub-condition 215B indicates that a request to access the resource may be allowed if the client (e.g., a compute instance) does not have any external connectivity outside of the virtual network that the client is located within, per the condition type of "Bool" (i.e., "Boolean") and the value of "false" for the attribute "Client:HasExternalConnectivity." In some embodiments, when both sub-conditions 215A-215B of the virtual network security condition statement 210A are satisfied, the request is allowed without needing to further evaluate the second policy statement 200B.

This illustrated policy statement 200 also includes a second virtual network security condition statement 210B for the same resource (per the same resource identifier element 205B). This second virtual network security condition statement 210B is configured with a different effect element 220B that will throttle a request (e.g., cause the fulfillment of the request to be delayed or denied according to a rate-limiting technique) when its virtual network security condition statement 210B is satisfied. In this illustrated example, the effect element 220B further includes a variable element allowing the effect to be customized according to a "throttlevalue" variable. For example, such a variable could be set by the account (as an account setting) or user to indicate an amount or degree that the throttling is to be implemented—e.g., a number of requests per minute, per hour, per day, etc., involving the data, user, etc. Alternatively, the "throttlevalue" variable could be determined based upon a current load of the associated resource—e.g., when the resource experiences a higher load, the value of "throttleValue" can be set to increase an amount of throttling that is performed. The use of such variables can thus allow for dynamic customization of the effect (e.g., throttling).

As shown, the second virtual network security condition statement 210B includes two sub-conditions that must both be satisfied for the second virtual network security condition statement 210B to be satisfied, and thus, for the effect to occur. In this example, if the value of a token with an identifier of "SecurityPostureToken" is a numeric value greater than or equal to 75 (per the condition operator "NumericGreaterThanEquals" and the value of "75"), and also that the requesting client does not have any external connectivity outside of the virtual network that the client is located within, the request will be throttled (e.g., allowed but delayed, denied if a throttling condition is satisfied, etc.).

In some embodiments, when no policy statement is satisfied, a request will be denied. Thus, using this simple illustrated example, a request with an associated "SecurityPostureToken" value less than 75 would be denied. Likewise, a request from a client that has external connectivity—regardless of its SecurityPostureToken value—would also be denied.

The illustrated virtual network security condition statements 210A-210B provide a simple example, and many variations from this example are utilized in different scenarios and embodiments—e.g., using only some of these illustrated elements of the policy, and/or different effect elements (allow, deny, throttle, etc.), different actions (e.g., specific access request commands), different resources (identified in different resource identifier elements 205A-

205B), different condition operators (StringEquals, NumericGreaterThan, BinaryEquals, etc.), etc.

For example, other virtual network security condition statements 210 could be configured to require different security postures of the calling user's virtual network. For example, one or more conditions could be configured to require: that remote connections (e.g., Secure Shell (SSH) sessions) are not allowed into or out of a compute instance of the calling user, that one or more security-related settings of a compute instance or virtual network are enabled, that the compute instance and/or virtual network is locked from being able to be further modified, that a security service has assigned the compute instance and/or virtual network a particular security score, that the calling client is using a source network address that is known to be assigned or utilized by the user, that a security service is currently enabled to monitor the compute instance and/or virtual network, that one or more of these conditions has been true for at least a threshold amount of time prior to an access request, that no other compute instances exist within the virtual network, that the compute instance and/or virtual network is only allowed to access the desired data service (and not any other entities inside or outside of the service provider system), that a scan has been performed and no blacklisted or vulnerable code/packages exist in the compute instance and/or virtual network, that the compute instance and/or virtual network was created within a threshold amount of time from the time of the request, that no other users/groups have certain access privileges to the compute instance and/or virtual network, etc.

Turning back to FIG. 1, after the configuration of the policy 110 including the virtual network security conditions 112 (e.g., the virtual network security condition statements 210A-210B), a client 104A (of user 130A) at circle '2' may transmit an access request 120 to access a resource (the data 116 of data service 114A). The access request 120 is received by the policy enforcement service 108. As shown in FIG. 1, the policy enforcement service 108 may be located (e.g., as a software executed by one or more electronic devices) inline between the client 104A and the data service 114A as part of an authorization agent 124, though in some embodiments the authorization agent 124 may be part of the data service 114A itself.

The client 104A, in some embodiments, is a software module (e.g., of an application executing upon/in a compute instance 106A) executed by one or more electronic devices of the service provider system 100. The access request 120 can be of a variety of types/formats selected based on the particular implementation of the service provider system 100. For example, the access request 120 could include one or more HTTP request messages sent to an internal or external API endpoint of the service provider system 100 (e.g., as a Web service), which can be according to a RESTful API. In some embodiments, the access request 120 is a command to insert an access request entry into a queue, where the queue is managed by a service of the service provider system 100 and used to "route" such messages to the appropriate service(s).

Upon receipt of the access request 120 at circle '3', the policy enforcement service 108 determines whether the access request 120 is to be allowed to access the resource (i.e., be "served" or "fulfilled" and thus be able to access the data 116 of account 'B' 132B or user 'B' 130B) according to the one or more condition(s)—including virtual network security conditions 112—set forth by the policy 110. This determination can be part of a set of authorization operations (to determine whether the access request 120 is an authorized access), which may or may not occur along with a set of authentication operations (to determine whether the access request 120 was actually issued by a client 104 on behalf of a valid user 130A).

As indicated above, the service provider system 100—e.g., the policy enforcement service 108—determines whether the policy 110, including the virtual network security conditions 112—allows the access request 120 to be fulfilled. This determination includes obtaining and evaluating the policy 110 using security data that is indicative of a current and/or previous security posture of the calling virtual network and/or compute instance. Further detail regarding the use of security data, and its acquisition, will be provided later herein with regard to FIG. 3, FIG. 4, and FIG. 5.

With the policy 110 and security data, the policy enforcement service 108 evaluates the conditions of the policy 110—including the virtual network security conditions 112. Using the example of FIG. 2, a security posture token (part of security data) may include a numeric value (e.g., 100, 95, 75.2), and the policy enforcement service 108 determines whether this numeric value is equal to the provided value of "100" or "75" from the policy. Similarly, a security data may include a Boolean value (or a "string" of alphanumeric text, etc.) indicating whether the client has any external network connectivity outside of its virtual network, and thus the policy enforcement service 108 determines whether this value satisfies the sub-condition(s) requiring no external network connectivity from the policy.

Using the policy statements 200A-200B of FIG. 2 as an example, when the virtual network security condition(s) 112 of a virtual network security condition statement 210A are met, the policy enforcement service 108 is to act according to the effect element of the policy statement to perform one or more security actions 122 (at circle '6A')—e.g., allow, deny, or throttle the access request 120. In some embodiments, to deny the access request 120, the policy enforcement service 108 prevents the data service 114A from servicing the access request 120 and may send an access response 126 message back to the client 104A indicating that the access request 120 is denied at circle '6B.' The policy enforcement service 108 may also allow, at circle '5', the access request 120 to be serviced by the data service 114A.

As indicated above, the policy enforcement service 108 performs one or more security actions 136 at circle '6A'. The security action(s) 122 can be set uniformly across the service provider system 100, set or customized by the data 116 owning user 130B, etc. For example, the security action(s) 122 can include one or multiple actions such as blocking the access request 120 from being fulfilled (e.g., preventing access to the data 116), notifying the user 130B or account 132B (e.g., sending a short message service (SMS) message, email, phone call, etc.), notifying the client 104A (e.g., sending an access response 126 indicating that the request 120 is denied), delaying the request from immediately being processed, etc.

In some embodiments, the security action(s) 122 include (at circle '6C') allowing the access request to be fulfilled, and setting an alarm for a "grace period" amount of time (e.g., 30 minutes, 1 hour, etc.). Upon the expiry of that grace period (e.g., as indicated by the expiry of the alarm), subsequent requests will then be blocked. Such a grace period configuration can be beneficial in a variety of scenarios, such as when the data owner wishes to allow the data processing user a brief amount of time to remedy a security problem while continuing to access the data without interruption.

In some embodiments, upon a client's 104A initial successful access request 120, the virtual network 102A and/or the compute instance 106A may be "locked" so that the virtual network 102A and/or the compute instance 106A must maintain at least a same overall security posture going forward in time. For example, the virtual network 102A can be locked so that no additional ports can be opened into or out of the network, though the user 130A remains free to further close ports as this would result in a more restrictive security posture. Similarly, the virtual network 102A could be locked so that no additional compute instances 106A are able to be launched, etc. In some embodiments, such "locking" of a first user's 130A resources by a policy 110 defined by a second user 130B must be approved by the first user 130A.

Figure 3:
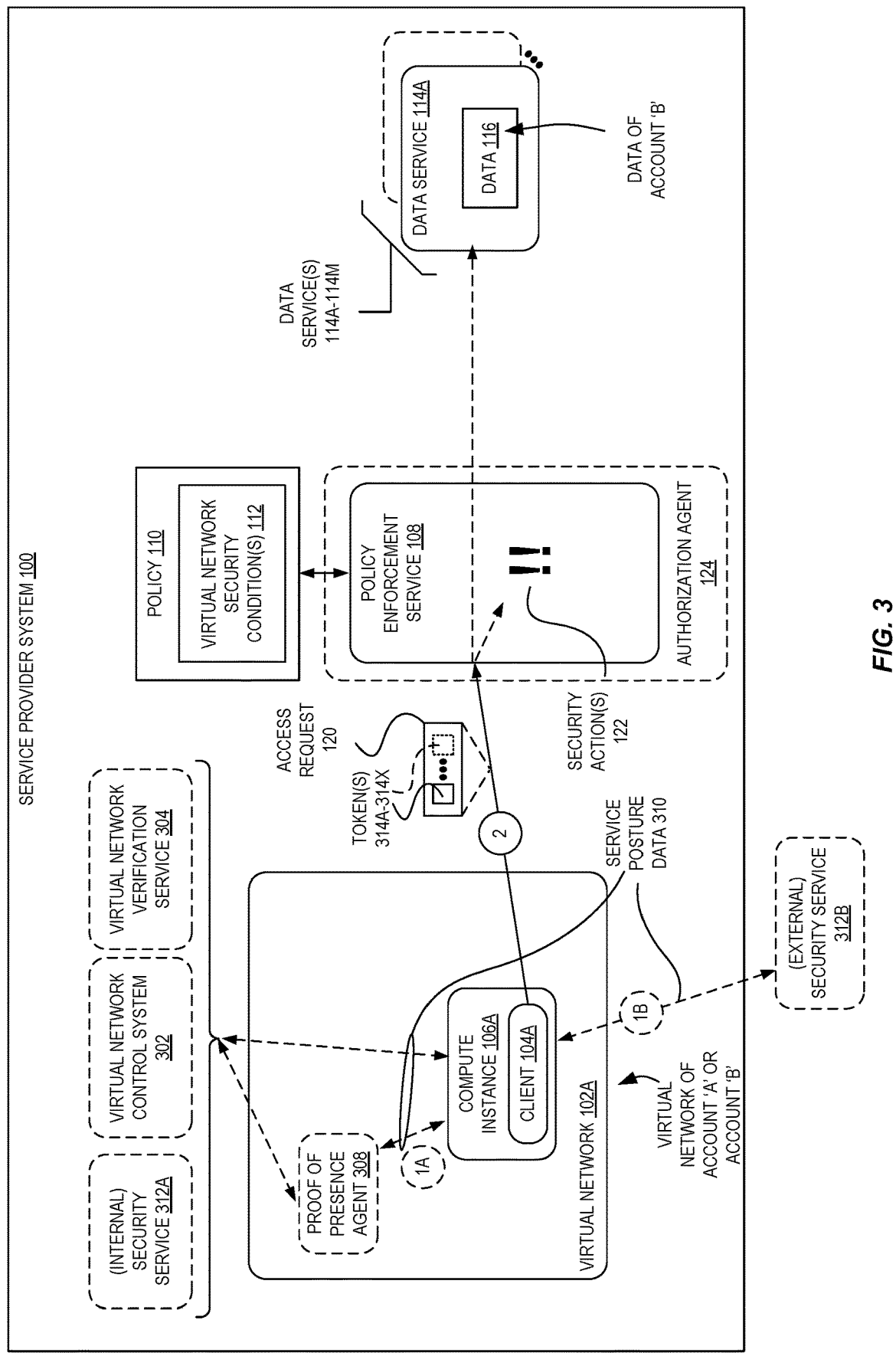
FIG. 3 is a block diagram illustrating a service provider system utilizing client-provided security data for data source driven expected network policy control according to some embodiments.

The policy enforcement service 108, to evaluate the virtual network security conditions 112 of the policy statements of the policy 110, utilizes security data that is indicative of a current and/or previous security posture of the calling virtual network and/or compute instance. For example, FIG. 3 is a block diagram illustrating a service provider system 100 utilizing client-provided security data for data source driven expected network policy control according to some embodiments.

In this illustrated example, the client 104A provides the security data in the form of one or more tokens 314A-314X to the policy enforcement service 108 (instead of the policy enforcement service 108 obtaining security data on its own). Such a configuration can be beneficial in a variety of settings, e.g., to avoid introducing extra delay during the policy 110 evaluation and thus allow for access requests to be processed by the policy enforcement service 108 as quickly as possible.

The client 104A, in some embodiments, acquires the token(s) 314A-314X from one or more sources at circle '1A' and/or circle '1B' as part of service posture data 310. The service posture data 310 includes one or more token(s) 314A-314X, and optionally may include signatures generated by the one or more sources for the one or more token(s) 314A-314X. The client 104A can selectively acquire token(s) 314A-314X from one or more sources based on which security postures are required to access the data 116. The client 104A, in some embodiments, determines which security postures are required via an explicit configuration from the user 130A (who may have been told what security postures are required by user 130B), and/or by identifying which security postures are required via communicating with the policy enforcement service 108 and/or data service 114A, which will be described in further detail with regard to FIG. 6. The token(s) 314A-314X can be data of a variety of types of formats that describes one or more aspects of something (e.g., a virtual network, a compute instance, a set of access control policies, a set of firewall rules). As one example, the token(s) 314A-314X can be JavaScript Object Notation (JSON) or Extensible Markup Language (XML) formatted alphanumeric text, though many other data types and structures can be used in various embodiments.

The token(s) 314A-314X may be in plaintext format, which allows for the client 104A to identify scenarios where it will be unable to have an access request 120 fulfilled due to identifying that the token value will or will not satisfy a virtual network security condition 112 that protects the data 116. Plaintext tokens, in some embodiments, are signed using cryptographic techniques such that the token can be verified, by the policy enforcement service 108, as being authentic and thus not tampered with (e.g., using symmetric key cryptography, using public-private key cryptography, etc.). Thus, in these embodiments, the tokens may be provided along with a cryptographically-generated signature of the tokens in the service posture data 310. However, in some embodiments one or more of the tokens may not be provided in plaintext to the client 104A, and instead may be provided in an encrypted form due to being encrypted using a key that is available to the policy enforcement service 108, but not the compute instance 106A, which can prevent token tampering.

As one example, a virtual network security condition 112 may require that the client 104A is utilizing a source network address (e.g., a source Internet Protocol (IP) address, which may be a private address used within the virtual network 102A) that, from the perspective of the service provider system 100 has been known to have been used by that particular client 104A or compute instance 106A before, and/or that the client 104A or compute instance 106A is actually located within a particular virtual network. The use of such a security posture can eliminate the likelihood that that another compute instance (e.g., compute instance 106B) external to the virtual network 102A or within the same virtual network 102A as the compute instance 106A of the client 104A is not attempting to fraudulently access data 116 by impersonating the compute instance 106A (e.g., using identity information of the compute instance 106A or client 104A). To provide security data verifying this requirement to the policy enforcement service 108, in some embodiments the client 104A requests a token from a proof of presence agent 308 indicating that the client 104 is using a network address that is known to have been previously associated with (e.g., assigned to, utilized by) that compute instance 106A. In some embodiments, the proof-of-presence agent 308 executes within the virtual network 102A or logically appears to be within the virtual network 102A through use of a private network address of the virtual network (despite being located outside of the virtual network), where traffic involving the private network address can be sent (or "tunneled") between the virtual network and the proof of presence agent 308 (e.g., by a gateway). In some embodiments, the proof of presence agent 308 may be implemented as part of an instance metadata service.

The proof of presence agent 308 may monitor the virtual network 102A to maintain a data structure that maps identities of actors (e.g., compute instances, clients, etc.) of the virtual network to network addresses used by those actors. Thus, the proof of presence agent 308, in some embodiments, generates a proof-of-presence token by identifying an asserted identity of the requesting compute instance 106A/ client 104A (e.g., via a credential within the request) and performing a lookup in the data structure. When a match is found—e.g., the identity is known to be associated with the currently-utilized network address of the request, the proof of presence agent 308 generates a token attesting to the match.

In some embodiments, the proof of presence agent 308 acts as a primary source of service posture data 310 for the client 104A, and in some embodiments the proof of presence agent 308 acts as an intermediary to acquire service posture data 310 (e.g., tokens) from other systems/services, including but not limited to the virtual network control system 302, internal security service 312A, and/or virtual network verification service 304.

A virtual network security condition 112 of a policy statement could be configured to require that the account of the corresponding user/entity—within the service provider system 100—has maintained a particular security status over an amount of time to be allowed access to data. For example, a virtual network security condition 112 could require that the account does not have any user roles defined that are permissive in some aspect—e.g., allowing additional users or roles to be created under the account, etc. To provide security data verifying this requirement to the policy enforcement service 108, the client 104A can request a token from a virtual network control system 302 that maintains or has access to records of the service provider system 100.

As another example, a virtual network security condition 112 may be configured to require that the client 104A and/or compute instance 106A does not have particular network ports open, is not running certain software, does not utilize code or packages with known vulnerabilities, etc. Accordingly, in some embodiments the client 104A obtains service posture data 310 including one or more tokens from the virtual network control system 302 and/or virtual network verification service 304, as these services may have visibility into the current and/or historic security posture of the compute instance 106A.

As another example, a virtual network security condition 112 may be configured to require that the client 104A operates within a virtual network 102A that is configured in particular ways or operates in particular ways. For example, a virtual network security condition 112 may indicate that user-controlled instances (e.g., compute instance 106A) within the virtual network 102A are only allowed external connectivity to the particular data service 114A, that the virtual network 102A does not have or previously has not ever had any other open connections to other extra-virtual network endpoints, etc. In some embodiments, the client 104A obtains service posture data 310 from a virtual network verification service 304 indicating whether these one or more network-centric security postures are met.

A virtual network verification service 304, in some embodiments, is a service within the service provider system 100 that allows users (e.g., client 104A) or other services (e.g., policy enforcement service 108) to issue a query constructed in a declarative logic programming language about their virtual network. The virtual network verification service 304 can evaluate the query as a constraint problem, and provide results for the queries by resolving the queries using a constraint solver engine. Accordingly, the client 104A—either directly or through proof of presence agent 308—can cause queries to be sent to the virtual network verification service 304 to determine, from the perspective of the service provider system 100 whether a virtual network-related security posture is satisfied. For example, a client 104A could query the virtual network verification service 304 to determine whether a compute instance is able to communicate with another compute instance, whether a compute instance is able to send data to the Internet (e.g., whether a virtual internet gateway or Network Address Translation (NAT) service exists within a virtual network of the compute instance), whether a firewall is active in a virtual network, etc.

As another example, a virtual network security condition 112 may be configured to require that the client 104A and/or the compute instance 106A and/or the virtual network 102A has a particular security score issued from an internal security service 312A or external security service 312B that indicates a level of current and/or historic compliance with one or more security checks, an amount of anomalous activity detected, a result of a virus scan, whether any vulnerable code has been found, etc. For example, the security score could be the "SecurityPostureToken" illustrated in FIG. 2, and thus could be a numeric value (e.g., an integer or real value between 0-100), an alphanumeric/textual value (e.g., "green" or "yellow" or "red"), a Boolean value, a combination of these types, etc. The internal security service 312A or external security service 312B can be implemented in a variety of ways to determine a variety of types of security scores. For example, the internal security service 312A and/or external security service 312B may be operable to detect the existence of vulnerable code by scanning for known vulnerable code patterns/files/objects, or by identifying a list of versions of software (e.g., executables, packages, libraries) that exists (or executes) within a compute instance and comparing the entries of the list against a list of known vulnerable software.

With the service posture data 310, the client 104A issues an access request 120 at circle '2' including the one or more tokens 314A-314X (and optionally the associated signatures thereof) from the service posture data 310. In some embodiments, the token(s) 314A-314X are placed in an authorization header of an HTTP request or in a "security posture" header of an HTTP request. Upon receipt of the access request 120, the policy enforcement service 108 obtains the policy 110 and evaluate the virtual network security condition(s) 112 of the policy statement(s) using the token(s) 314A-314X as described elsewhere herein.

Figure 4:
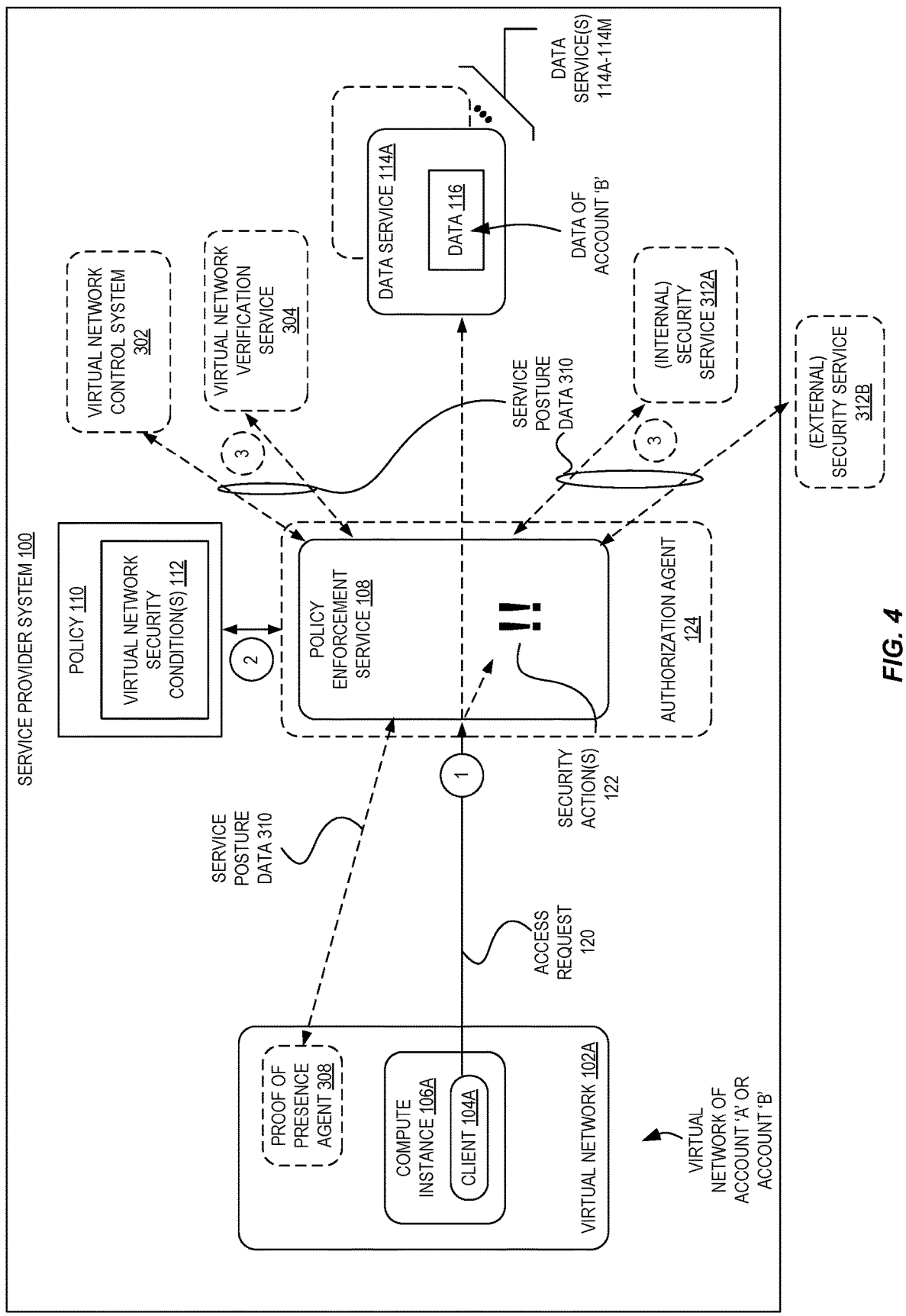
FIG. 4 is a block diagram illustrating a service provider system utilizing data-side security data acquisition for data source driven expected network policy control according to some embodiments.

Another system configuration is shown in FIG. 4, which is a block diagram illustrating a service provider system 100 utilizing data-side security data acquisition for data source driven expected network policy control according to some embodiments. In this figure, the depicted systems and services that provide service posture data 310 (e.g., virtual network control system 302, virtual network verification service 304, internal security service 312A, external security service 312B, proof of presence agent 308) may perform similar functions as those described with respect to FIG. 3. However, in FIG. 4, the policy enforcement service 108 obtains the service posture data 310 from one or more of these systems and services (at circle '3') instead of being provided tokens in an access request 120 (as in FIG. 3). This configuration can ease the burden on the client 104A for making access requests, as the client 104A need not do any token acquisition in order to make an access request.

In FIG. 4, upon receipt of an access request 120 (at circle '1') for the data 116 of the data service 114A, the policy enforcement service 108 obtains the policy 110 (at circle '2'), scans the virtual network security condition 112 to identify what security data is needed to evaluate the virtual network security condition 112, and obtains (e.g., issues requests for, and receives response thereto) service posture data 310 (including tokens) at circle '3' from the corresponding services and systems that are able to provide the tokens necessary for evaluating the policy 110. The identification of the corresponding services and systems, in some embodiments, includes performing a lookup in a data structure that maps token types identified by policies with the corresponding token sources.

Figure 5:
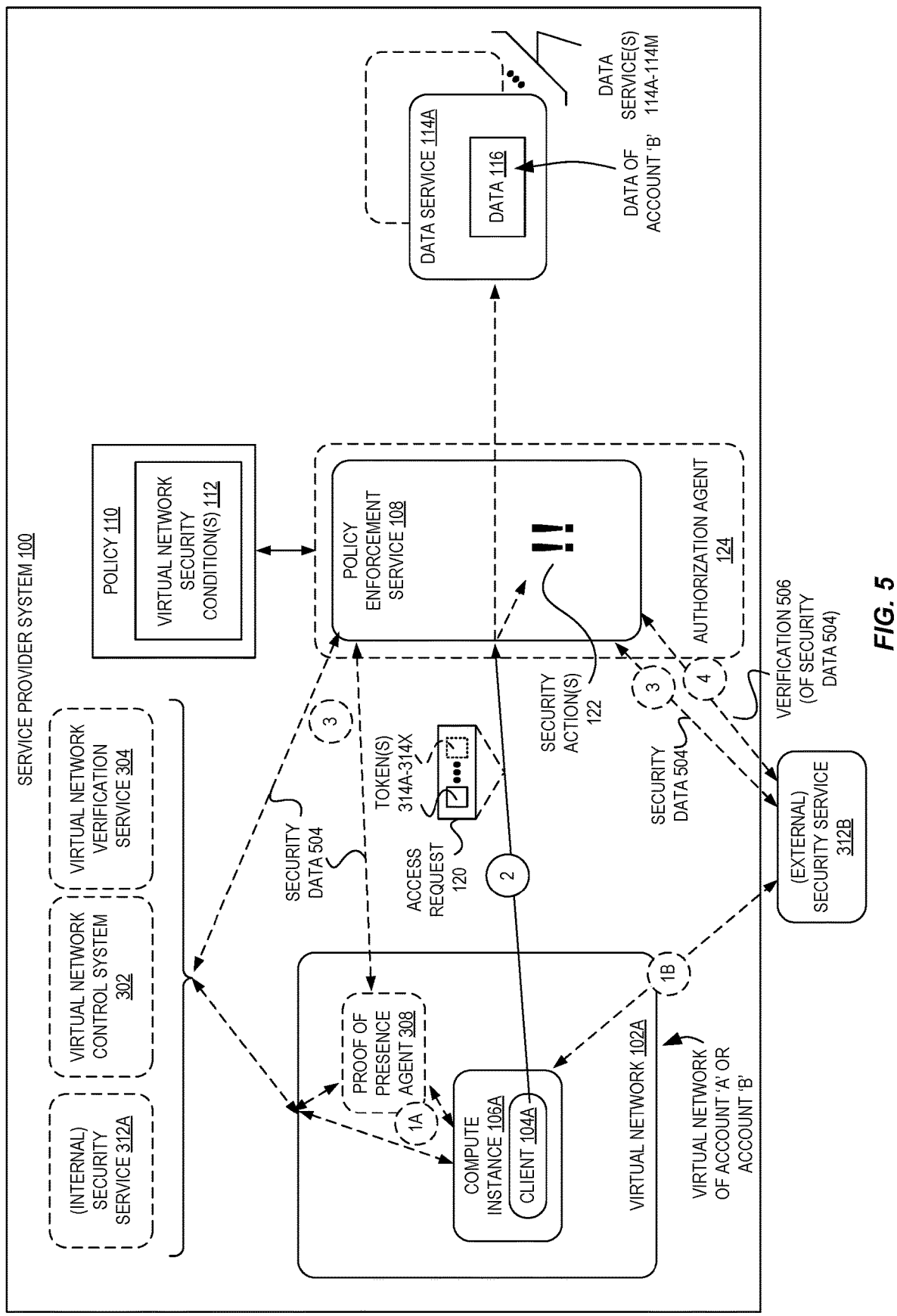
FIG. 5 is a block diagram illustrating a service provider system utilizing a hybrid approach including data-side security data acquisition and client-provided security data according to some embodiments.

Another exemplary configuration is illustrated in FIG. 5, which is a block diagram illustrating a service provider system 100 utilizing a hybrid approach including data-side security data acquisition and client-provided security data according to some embodiments. In FIG. 5, both the client 104A and the policy enforcement service 108 may obtain security data to be used to evaluate virtual network security condition(s) 112.

For example, in some embodiments the client 104A may operate as described with regard to FIG. 3, and thus obtain security data at circle '1A' and/or circle '1B' (including tokens 314A-314X) to be provided with an access request 120 sent at circle '2.' In some cases, these tokens 314A-

314X may satisfy the data needed for evaluating the virtual network security condition(s) 112 of the policy 110, and the policy enforcement service 108 may not acquire any security data on its own.

However, the policy enforcement service 108 may also obtain security data 504 at circle '3'—e.g., from external security service 312B, internal security service 312A, virtual network control system 302, virtual network verification service 304, etc. This configuration can be useful in a scenario where the client 104A is prohibited from being able to obtain certain security data, such as when the client 104A is unable to communicate with endpoints outside of the virtual network 102A and/or service provider system 100. In this case, the client 104A may be able to provide zero tokens or some tokens 314A-314X for the evaluation of the policy 110, while the policy enforcement service 108 can obtain remaining security data 504 that includes the token(s) needed for policy 110 evaluation on its own.

In some embodiments, the client 104A obtains security data from an external security service 312B at circle '1B', and the policy enforcement service 108 also communicates with the external security service 312B at circle '4' to perform a verification 506 of the integrity of the client-provided token 314A (e.g., sending a query to the external security service 312B asking whether a particular token is correct for a particular client, and receiving a response indicating the answer). This configuration can be helpful when the external security service 312B is not able to (or not configured to) utilize message authentication techniques such as signatures, encryption, etc.

As indicated earlier herein, the client 104A can determine which security postures (and thus, what tokens) are required by being configured by its associated user, who may have been told what security postures are required by the data owner user. However, in some embodiments, the client 104A can identify which security postures are required via communicating with the policy enforcement service 108 and/or data service 114A.

Figure 6:
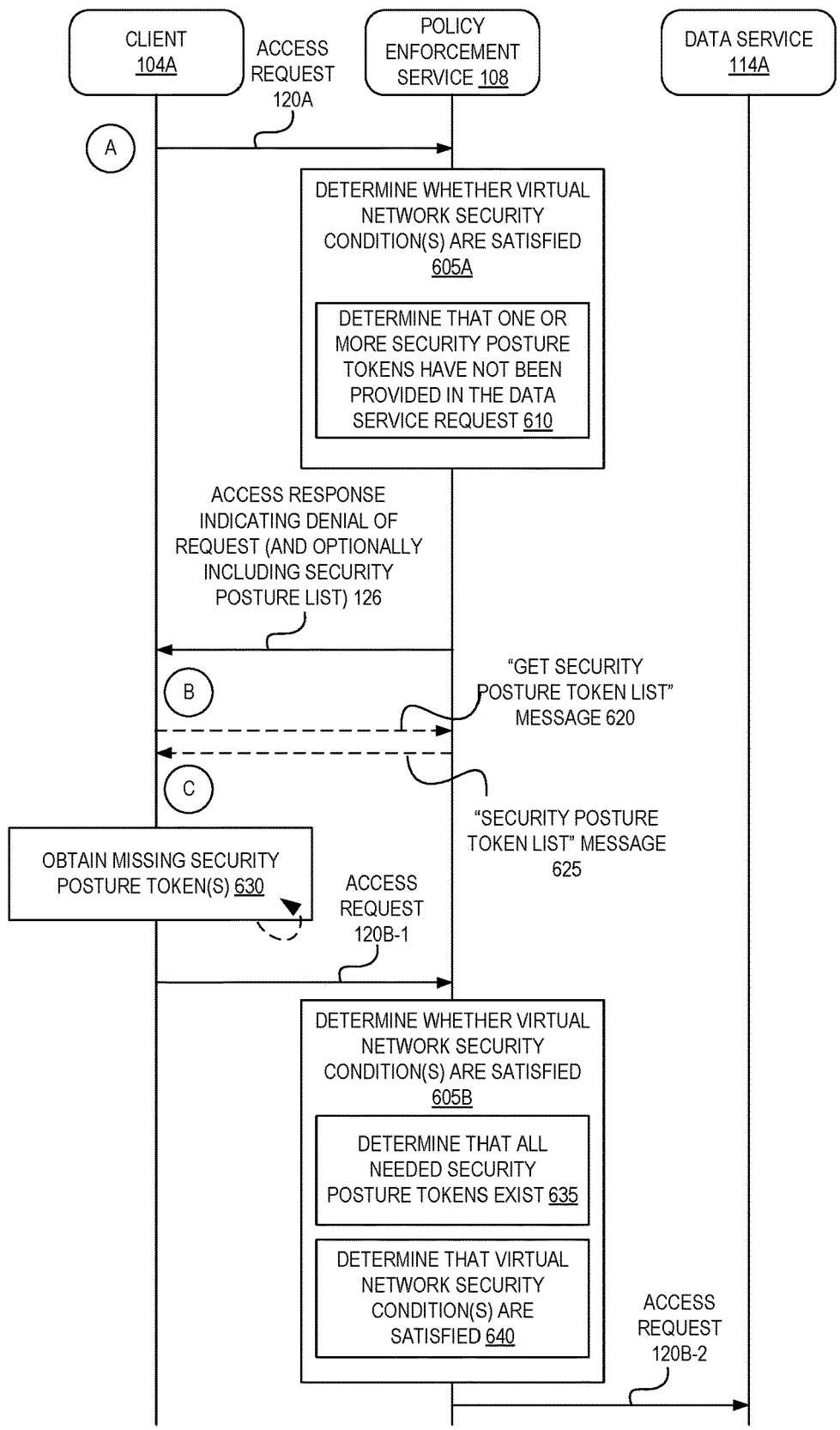
FIG. 6 is a combined flow and sequence diagram illustrating messaging and operations involving a client, policy enforcement service, and data service according to some embodiments.

For example, FIG. 6 is a combined flow and sequence diagram illustrating messaging and operations involving a client 104A, policy enforcement service 108, and data service 114A according to some embodiments. However, in some embodiments the policy enforcement service 108 is a component of the data service 114A, and thus the separate third line for the data service 114A may instead represent a request processor unit of the data service 114A that processes a particular request (e.g., by identifying the type of access and involved data, and/or performing the requested access).

At circle 'A', the client 104A issues an access request 120A to access data of data service 114A, which is received by the policy enforcement service 108. Although not illustrated, the policy enforcement service 108 may cause an authentication and/or authorization of the access request 120A to determine whether the particular client 104A is legitimate within the service provider system and/or whether that client 104A is authorized to perform the particular type of data access sought.

At block 605A, the policy enforcement service 108 determines whether the virtual network security condition(s) of an access control policy associated with the desired resource are satisfied, as described earlier. This block 605A can be part of performing authorization operations for the access request 120A. For example, the policy enforcement service 108 can identify the resource that is the target of the access request, identify any security posture tokens that may have been provided in the access request, obtain a policy associated with the resource that includes a virtual network security condition(s), and identify security posture tokens that are needed to evaluate the virtual network security condition(s).

In some embodiments, block 605A includes determining whether any provided security posture tokens are invalid. The token(s), in some embodiments, have an associated time to live (TTL) value indicating an amount of time that the token(s) will remain valid. Thus, policy enforcement service 108 may determine whether a token is valid by determining an expiry time for the token based at least on the TTL value (e.g., identifying the TTL value when the TTL value is a time and/or date stamp, and optionally converting it to a canonical time or local time), determining a current system time, and determining whether the expiry time has already passed. When the expiry time has already passed, the policy enforcement service 108 can treat the token as not having been provided.

In this case, block 605A includes block 610, where the policy enforcement service 108 determines that one or more security posture tokens needed to evaluate the virtual network security condition have not been provided in the access request 120A. This result of block 610 may occur due to the client 104A initially attempting to access the data but not knowing that any security posture tokens were required. Alternatively, this result of block 610 may occur due to the owner/guardian of the data having changed the virtual network security condition to include new and/or different virtual network security condition statements 210 that rely upon new and/or different security posture tokens.

Thereafter, the policy enforcement service 108 sends an access response 126 indicating that the access request 120A is denied. In some embodiments, the flow may continue at circle 13', where the client 104A sends a "get security posture token list" message 620 to the policy enforcement service 108 that seeks an indication of what security posture tokens are required to access the data. The policy enforcement service 108 in turn sends back a "security posture token list" message 625 that identifies which security posture tokens are required for access to the data. Thus, the client 104A proceeds to circle 'C' and obtain the missing security posture tokens at block 630 as indicated by the security posture token list message 625.

However, in some embodiments the access response 126 may itself include a security posture list, which includes identifiers of all security posture tokens that are required for access to the data, or includes identifiers of just those security posture tokens that were missing from the earlier access request 120A. In this case, the client 104A could continue at circle 'B' and send a "get security posture list" message 620, but since this is not strictly necessary the client 104A may instead proceed to circle 'C' and obtain the missing security posture data at block 630 indicated in the access response 126 message.

With the proper security posture tokens, the client 104A may then issue an access request 120B-1 including these tokens.

At block 605B, the policy enforcement service 108 determines whether the virtual network security condition(s) of an access control policy associated with the desired resource are satisfied, as described earlier. In this case, block 605B includes block 635, where the policy enforcement service 108 determines that all needed security posture tokens exist. For example, the policy enforcement service 108 determines that every security posture token that is needed from scanning the policy has been provided in the access request 120B-1. Block 605B further includes block 640, where the policy enforcement service 108 determines the virtual network security condition(s) have been satisfied. For example, the policy enforcement service 108 may evaluate each of the virtual network security condition(s) of the policy according to the condition type and the value stated in each condition, together with the value of the corresponding security posture token(s), to determine whether the condition is met.

Thus, the policy enforcement service 108 can allow the access request 120B-1 to be fulfilled by passing the access request 120B-2 on to the data service 114A.

Figure 7:
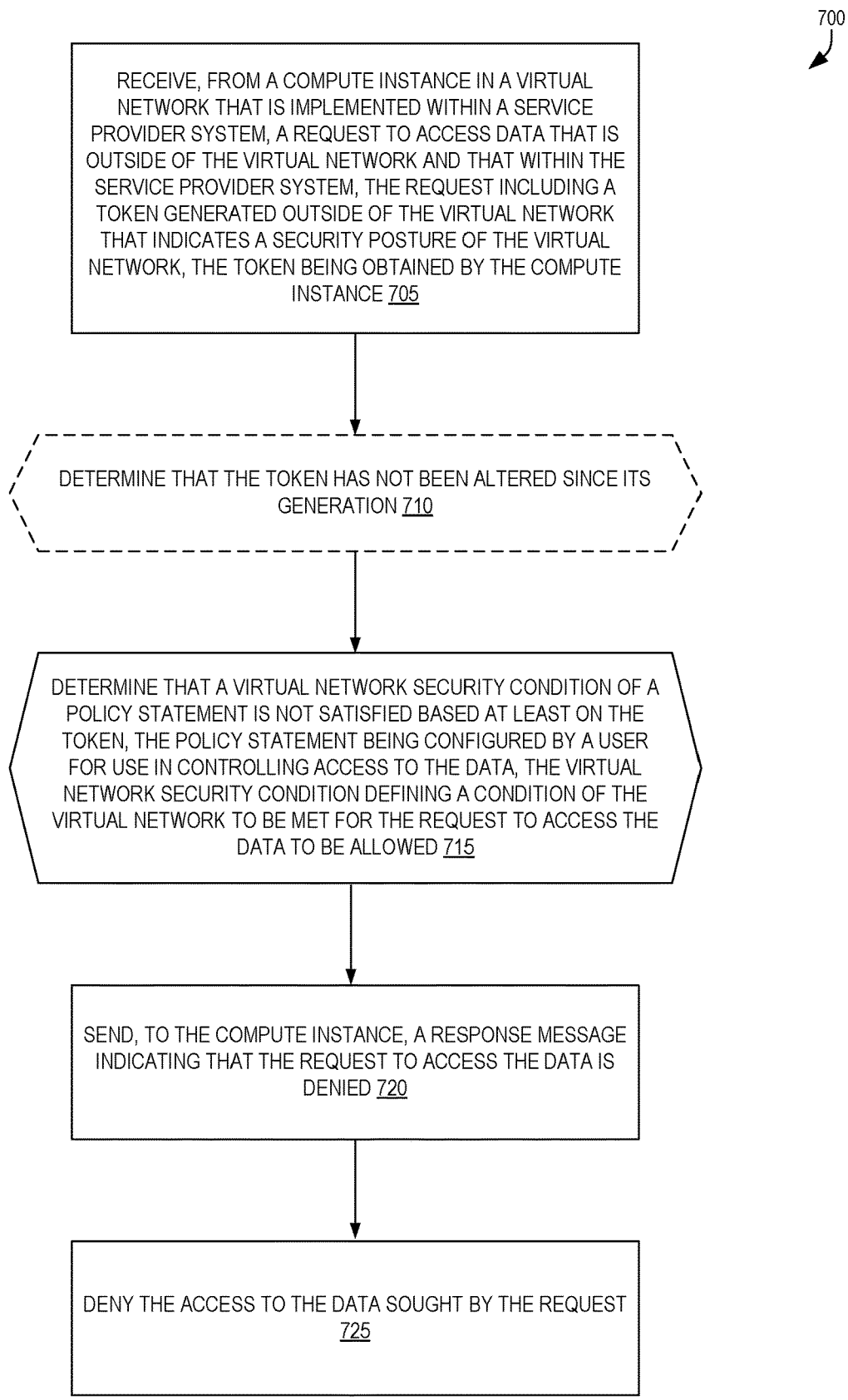
FIG. 7 is a flow diagram illustrating operations for data source driven expected network policy control according to some embodiments.

FIG. 7 is a flow diagram illustrating operations 700 for data source driven expected network policy control according to some embodiments. Some or all of the operations 700 (or any other processes described herein, or variations, and/or combinations thereof—such as operations 800, etc.) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising instructions executable by one or more processors. The computer-readable storage medium is non-transitory. In some embodiments, one or more of the operations 700 are performed by the policy enforcement service 108 of the other figures.

The operations 700 include, at block 705, receiving, from a compute instance in a virtual network implemented within a service provider system, a request to access data that is outside of the virtual network. In some embodiments, access to the data is located (e.g., provided by a data service) within the service provider system. The request includes a token generated outside of the virtual network that indicates a security posture of the virtual network. The token was obtained by the compute instance.

In some embodiments, the token indicates at least one of: whether the compute instance is able to send traffic to or receive traffic from the internet; whether the compute instance is able to send traffic to or receive traffic from other endpoints outside of the virtual network but within the service provider system; whether other compute instances exist within the virtual network; or whether any vulnerable code has been determined to exist within the compute instance or virtual network. In some embodiments, the token indicates at least one of: a first security score for the virtual network indicating a level of adherence, by the virtual network, to a first set of one or more security practices; a second security score for the compute instance indicating a level of adherence, by the compute instance, to a second set of one or more security practices; or an amount of time that the first security score for the virtual network has been maintained.

In some embodiments, the token was obtained by the compute instance from an instance metadata service executing within the virtual network; and the instance metadata service obtained the token from the security service that is outside of the virtual network.

Optionally, the operations 700 further include, at block 710, determining (e.g., by the policy enforcement service 108 or an authentication service of the service provider system), that the token has not been altered since its generation (e.g., by a security service). In some embodiments, block 710 includes determining whether the request includes a valid signature for the token. In some embodiments, the generator of the token encrypts (or otherwise transforms) some or all of the token using a key to yield a token signature. For example, the token signature could be generated by applying a transformation function (e.g., a Hash Message Authentication Code (HMAC) algorithm) using at least a part of the token. The policy enforcement service (or another service of the service provider system such as an authentication service) likewise generates a reference signature by identifying a key (stored in the service provider system) associated with the system/service that generated the token (having been provided therefrom at an earlier point in time) and encrypting/transforming the same part of the token using the stored key. When the resulting reference signature matches the provided signature of the token, the policy enforcement service 108 determines that the token was authentically generated and thus has not been altered. However, when the resulting reference signature does not match the provided signature of the token, the policy enforcement service 108 determines that the token was not authentically generated and thus has been altered. In this case, the altered token can be treated as not having been provided (in block 715), leading to determination that the virtual network security condition of the policy is not satisfied. In some embodiments, in addition to or instead of determining whether a token is authentic (e.g., has not been altered since its generation), the operations 700 also include authenticating the request itself—e.g., determining whether the request is issued on behalf of a valid user or account, that the type of request is allowed to be performed by the user or account, etc.

At block 715, the operations 700 include determining by the policy enforcement service that a virtual network security condition of a policy is not satisfied based at least on the token. The policy was configured by a user for use in controlling access to the data. The virtual network security condition defines a condition of the virtual network that is to be met for the request to access the data to be allowed. Block 715, in some embodiments, includes identifying the resource targeted by the access request, identifying a policy associated with the resource, scanning the policy to identify any required tokens, determining whether all required tokens have been provided in the request, and/or determining whether each virtual network security condition is satisfied. In this case, the result of block 715 is that at least one virtual network security condition is not satisfied.

At block 720, the operations 700 include sending, by the policy enforcement service to the compute instance, a response message indicating that the request to access the data is denied. In some embodiments, the response message indicates that a different token that indicates a different security posture must be provided in a subsequent request to access the data in order for the subsequent request to be allowed. At block 725, the operations 700 include denying the access to the data sought by the request.

Figure 8:
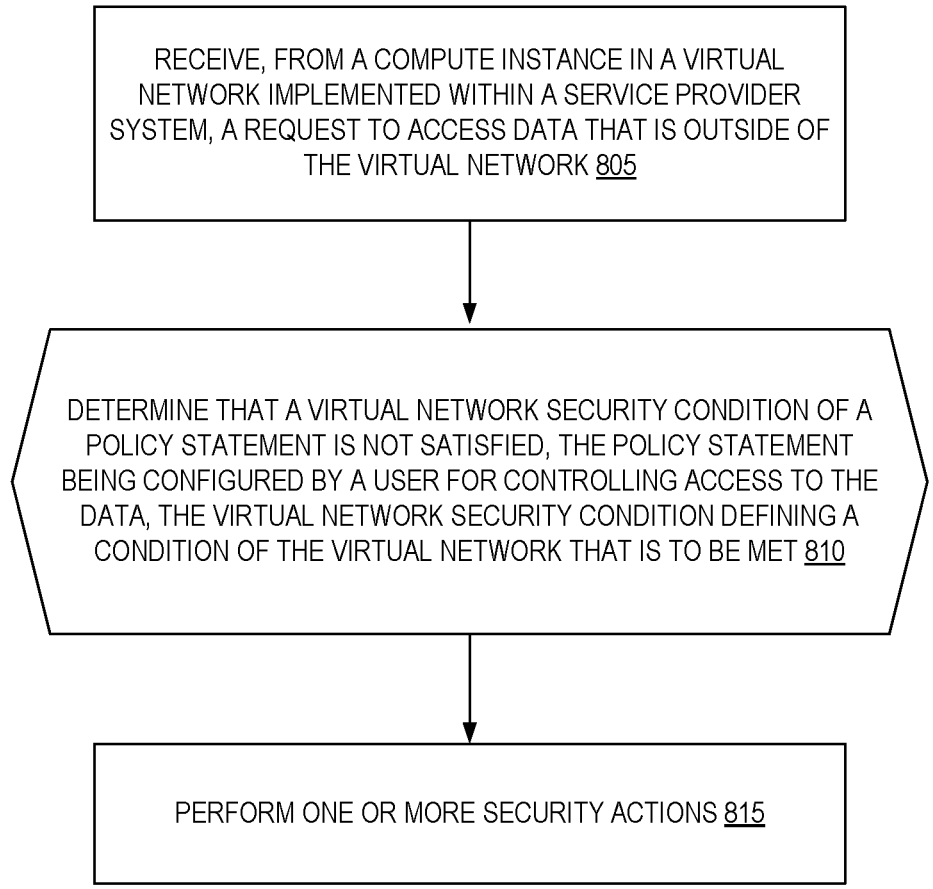
FIG. 8 is a flow diagram illustrating operations for data source driven expected network policy control according to some embodiments.

FIG. 8 is a flow diagram illustrating operations 800 for data source driven expected network policy control according to some embodiments. In some embodiments, operations 800 are performed by the policy enforcement service 108 of the other figures.

The operations 800 include, at block 805, receiving, from a compute instance in a virtual network of a first entity that is implemented within a service provider system, a request to access data that is outside of the virtual network. The request can be issued on behalf of a user or account, and the data can belong to a same or different user or account than that which issued the request. In some embodiments, access to the data is provided by a data service that is outside of the virtual network. The data service can be provided within the service provider system.

The operations 800 also include, at block 810, determining that a virtual network security condition of a policy is not satisfied. The policy was configured by a user (e.g., the data owner of the data) for use in controlling access to the data. The virtual network security condition defines a condition of the virtual network that is to be met in order for the request to access the data of the second entity to be allowed.

In some embodiments, the request includes a token indicating a security posture of the virtual network. The token may be generated inside the virtual network or outside of the virtual network. The token is obtained by the compute instance, and the determining that the virtual network security condition of the policy is not satisfied (e.g., of block 810) can be based at least in part on the token.

In some embodiments, determining that the virtual network security condition of the policy is not satisfied comprises: determining which virtual network of a plurality of virtual networks the compute instance operates within; obtaining the policy; obtaining data from a security service within the service provider system indicating a security posture of the virtual network; and comparing the data with a value indicated within the virtual network security condition, the value being specified by the user.

In some embodiments, the token indicates at least one of: whether the compute instance is able to send traffic to or receive traffic from the internet; whether the compute instance is able to send traffic to or receive traffic from other endpoints outside of the virtual network but within the service provider system; whether other compute instances exist within the virtual network; or whether any vulnerable code has been determined to exist within the compute instance or virtual network. In some embodiments, the token (e.g., generated by an internal or external security service) indicates at least one of: a first security score for the virtual network indicating a level of adherence, by the virtual network, to a first set of one or more security practices; a second security score for the compute instance indicating a level of adherence, by the compute instance, to a second set of one or more security practices; or an amount of time that the first security score for the virtual network has met or exceeded a threshold.

In some embodiments, the request further includes a second token. The second token may be generated by an agent that executes within the virtual network. The second token indicates that the compute instance is executing within the virtual network and is utilizing a network address that is known to have been previously used by or assigned to the compute instance.

The operations 800 also include, at block 815, performing one or more security actions. The one or more security actions can be directly performed by the policy enforcement service (e.g., blocking an access request), or the one or more security actions can be indirectly performed via the policy enforcement service sending a message to (or otherwise causing) another system to perform certain security actions, or can be performed by another system altogether. In some embodiments, the one or more security actions include: sending, to the compute instance, a response message indicating that the request is denied; and prohibiting the access to the data. In some embodiments, the one or more security actions include: allowing the access to the data of the second entity indicated by the request; and enabling an alarm, wherein upon an expiry of the alarm, additional requests to access the data of the second entity will be denied while the virtual network security condition of the policy remains not satisfied.

In some embodiments, the operations 800 further include, before the receiving of the request to access the data, receiving, from the compute instance, a request for a list of security posture tokens that are to be provided to gain access to the data; and sending, to the compute instance, the list of security posture tokens.

Figure 9:
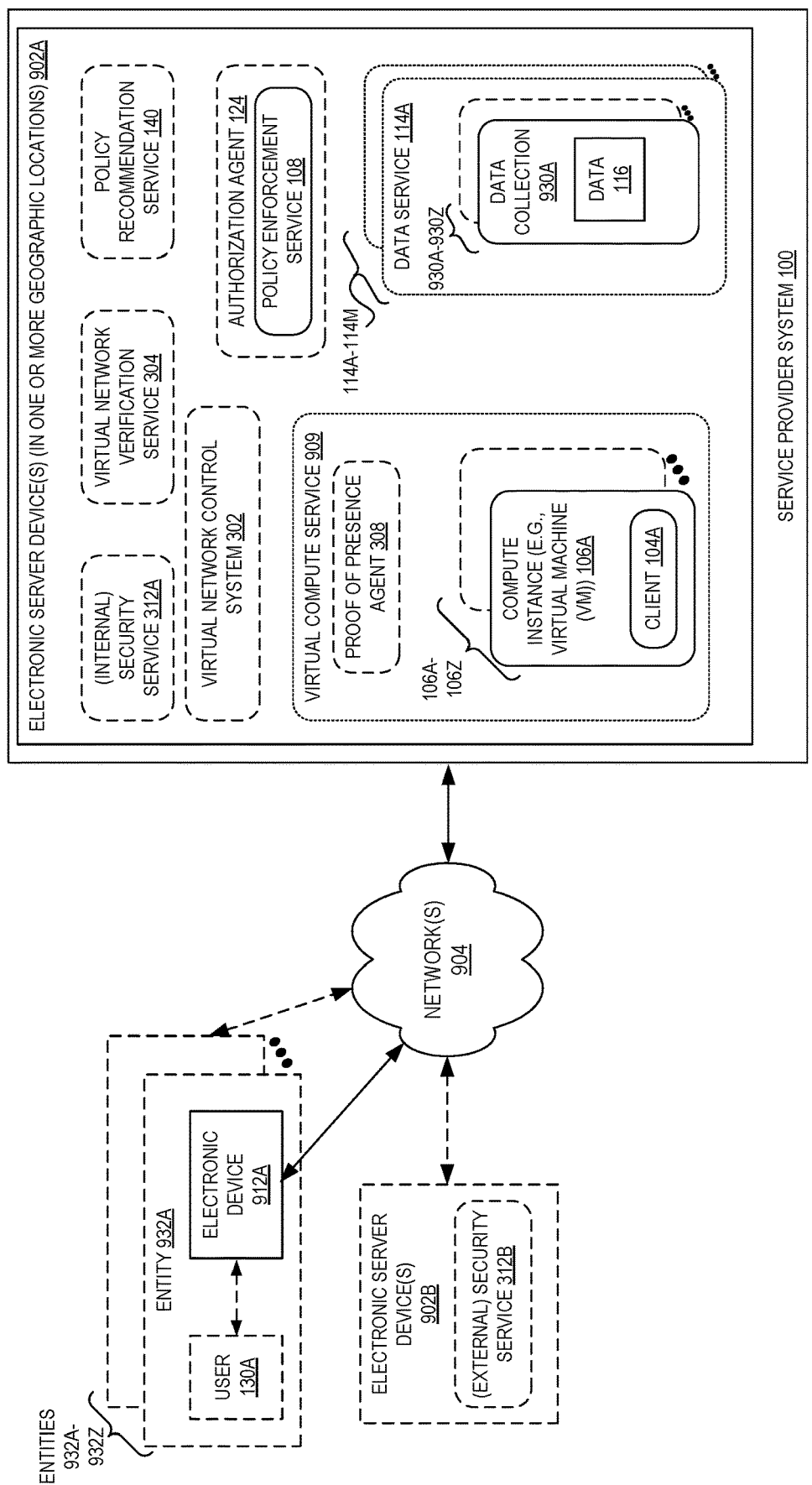
FIG. 9 is a block diagram illustrating example deployment implementations of components of a system implementing data source driven expected network policy control according to some embodiments.

FIG. 9 is a block diagram illustrating example deployment implementations of components of a system implementing data source driven expected network policy control according to some embodiments.

In some embodiments, the user 130A may be part of an entity 932A (e.g., an organization) and may operate an electronic device 914 of the entity 932A and/or within a network of the entity 932A. The electronic device 912A may be used to issue the policy configuration commands and/or access requests described herein. The electronic device 914 may be an electronic client device described in additional detail later herein.

The environment may further include one or more electronic server devices 902B that implement an external security service 312B. The one or more electronic server devices 902B may be within a network of an entity 932A, or located in a different location and/or operate in a different network.

Devices of the entity 932A may connect via one or more public networks 904 (e.g., the Internet) to the service provider system 100. The service provider system 100 can include one or more electronic server devices 902A, which may be located in multiple geographic locations. The one or more electronic server devices 902A implement one or more software entities, including but not limited to the provider security service 312A, virtual network control system 302, and/or virtual network verification service 304.

The one or more electronic server devices 902A also implement a virtual compute service 909 providing one or more compute instances 106A-106Z (e.g., VMs, containers) that execute one or more clients 104A-104Z. The one or more electronic server devices 902A also implement one or more data services 114A-114M. The data service 114A includes one or more data collections 930A-930Z (e.g., buckets, folders, volumes) storing data 116.

The one or more electronic server devices 902A, in some embodiments, implement one or more of an internal security service 312A, a policy recommendation service 140, a virtual network control system 302, a virtual network verification service 304, and/or a policy enforcement service 108—which may be part of an authorization agent 124 that performs authorization operations for determining whether particular requests are authorized to be performed. Although not illustrated, the one or more electronic server devices 902A in some embodiments also implement an authentication service that performs authentication operations, e.g., for determining whether requests are authentically originated by particular users/accounts.

Figure 10:
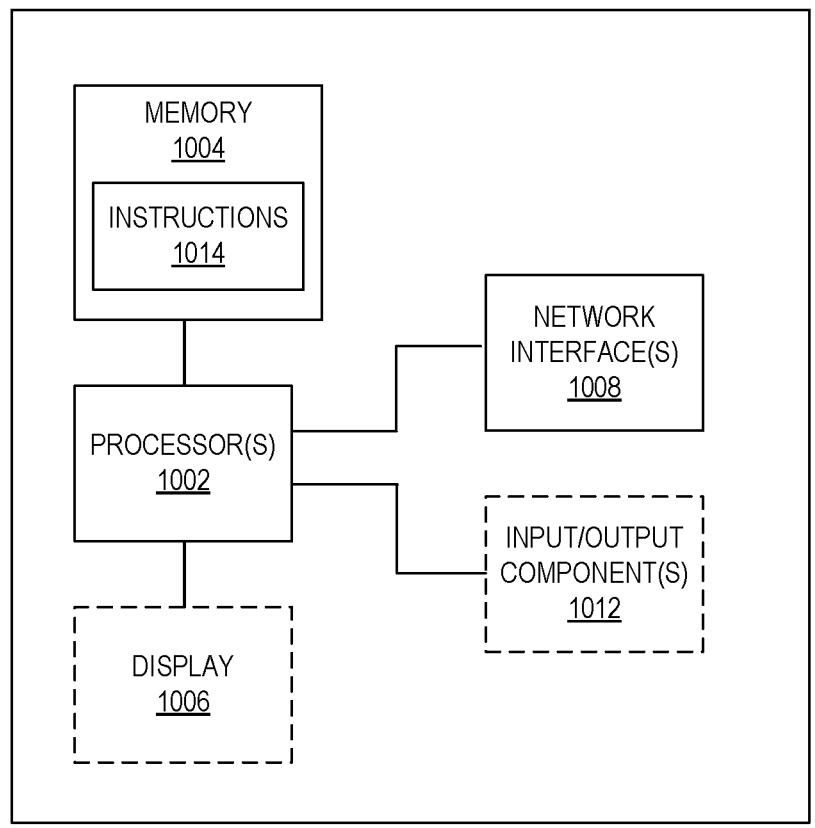
FIG. 10 illustrates a logical arrangement of a set of general components of an exemplary computing device that can be utilized in accordance with various embodiments.

FIG. 10 illustrates a logical arrangement of a set of general components of an example computing device 1000 such as electronic device 912A, electronic server device(s) 902B, electronic server device(s) 902A, etc. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (e.g., instructions 1014) and/or data, and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1014) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments can include at least one input and/or output component(s) 1012 able to receive input from a user. This input component can include, for example, a push button, touch pad, touch screen, wheel, joystick, keyboard, mouse, keypad, or any other such device or element whereby a user can input a command to the device. In some embodiments, however, such a device might be controlled through a combination of visual and/or audio commands and utilize a microphone, camera, sensor, etc., such that a user can control the device without having to be in physical contact with the device.

Figure 11:
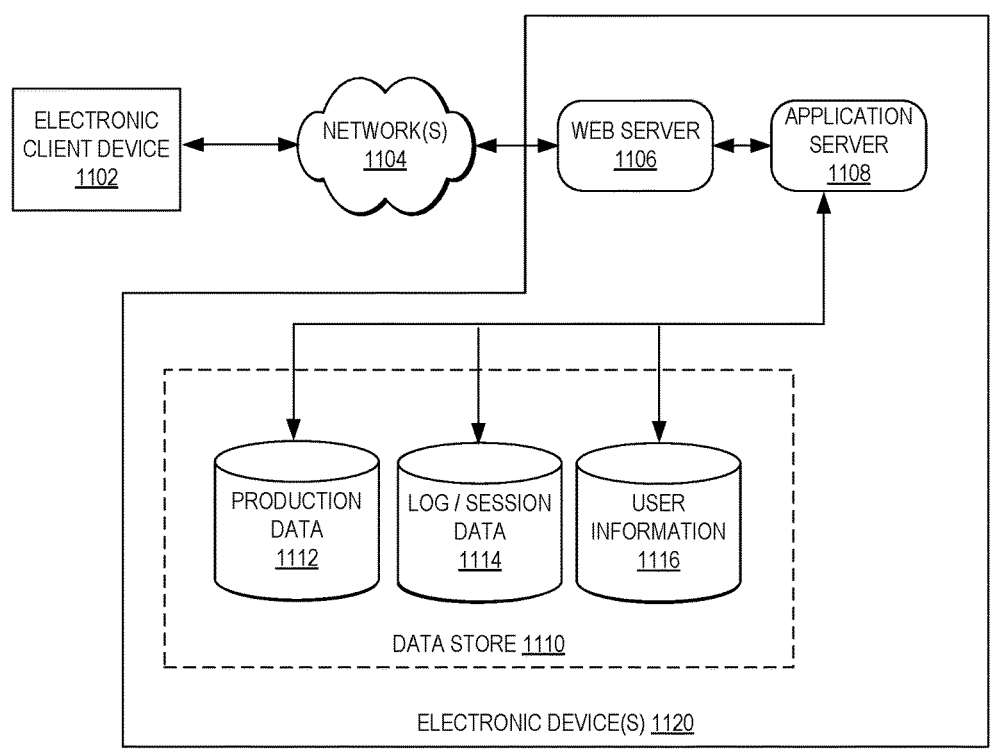
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments the policy configuration commands 111 and/or access request 120 are HTTP requests that are received by a web server (e.g., web server 1106), and the users 130A-130B via electronic devices 912A-912B may interact with the service provider system 100 (e.g., to define and manage policies and/or resources) via a web portal provided via the web server 1106 and application server 1108. As will be appreciated, although a web-based environment is used for purposes of explanation, different environments may be used, as appropriate, to implement various embodiments. The system includes an electronic client device 1102 (e.g., electronic device 912A), which may also be referred to as a client end station and can be any appropriate device operable to send and receive requests, messages or information over an appropriate network 1104 (e.g., network(s) 904) and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HTML, Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including HTTP servers, FTP servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclsoure as set forth in the claims.

What is claimed is:

1. A computer-implemented method comprising:
receiving, by a service provider system comprising a policy enforcement service, from a compute instance in a virtual network that is implemented within the service provider system, a request to access data that is outside of the virtual network and that is located within the service provider system, the request including a token generated outside of the virtual network that indicates a security posture of the virtual network, the token being identified by the policy enforcement service to the compute instance and obtained by the compute instance;
determining, by the policy enforcement service, that the token has not been altered since the token was generated outside of the virtual network;
determining, by the policy enforcement service, that a virtual network security condition of a policy statement is not satisfied based at least on the token, the policy statement being configured by a user for use in controlling access to the data, the virtual network security condition defining a condition of the virtual network that is to be met for the request to access the data to be allowed;
sending, by the policy enforcement service, to the compute instance, a response message indicating that the request to access the data is denied; and
denying the access to the data sought by the request.

2. The computer-implemented method of claim 1, wherein the token indicates at least one of:
whether the compute instance is or was able to send traffic to or receive traffic from the internet;
whether the compute instance is or was able to send traffic to or receive traffic from other endpoints outside of the virtual network but within the service provider system;
whether other compute instances exist or existed within the virtual network; or
whether any vulnerable code exists or existed within the compute instance or virtual network.

3. The computer-implemented method of claim 1, wherein the token indicates at least one of:
a first security score for the virtual network indicating a level of adherence, by the virtual network, to a first set of one or more security practices;
a second security score for the compute instance indicating a level of adherence, by the compute instance, to a second set of one or more security practices; or
an amount of time that the first security score or the second security score has met or exceeded a threshold value.

4. A computer-implemented method comprising:
receiving, by a service provider system comprising a policy enforcement service, from a compute instance in a virtual network implemented within the service provider system, a request to access data that is outside of the virtual network, the request including a token generated outside of the virtual network that identifies a security posture of the virtual network, the token being identified by the policy enforcement service to the compute instance and obtained by the compute instance;
determining, by the policy enforcement service, that the token has not been altered since the token was generated outside of the virtual network;
determining, by the policy enforcement service, that a virtual network security condition of a policy statement is not satisfied, the policy statement being configured by a user for use in controlling access to the data, the virtual network security condition defining a condition of the virtual network that is to be met, wherein the determining is based at least in part on the token; and
performing one or more security actions in response to determining that the virtual network security condition of the policy statement is not satisfied.

5. The computer-implemented method of claim 4, wherein the user is an owner of the data and operates under a first account, and wherein the request is issued on behalf of a second user of a second account.

6. The computer-implemented method of claim 4, wherein the user is an owner of the data and operates under a first account, and wherein the virtual network is under the control of the first account.

7. The computer-implemented method of claim 4, wherein the one or more security actions include:
sending, to the compute instance, a response message indicating that the request is denied; and
denying the access to the data sought by the request.

8. The computer-implemented method of claim 4, wherein the one or more security actions include:
allowing the access to the data indicated by the request; and
setting an alarm, wherein upon an expiry of the alarm, additional requests to access the data will be denied while the virtual network security condition of the policy statement remains not satisfied.

9. The computer-implemented method of claim 4, wherein the token indicates at least one of:
whether the compute instance is or was able to send traffic to or receive traffic from the internet;
whether the compute instance is or was able to send traffic to or receive traffic from other endpoints outside of the virtual network but within the service provider system;
whether other compute instances exist or existed within the virtual network; or
whether any vulnerable code exists or existed within the compute instance or virtual network.

10. The computer-implemented method of claim 4, wherein the token indicates at least one of:
a first security score for the virtual network indicating a level of adherence, by the virtual network, to a first set of one or more security practices;

a second security score for the compute instance indicating a level of adherence, by the compute instance, to a second set of one or more security practices; or an amount of time that the first security score or second security score has met or exceeded a threshold value.

11. The computer-implemented method of claim 4, wherein the request further includes a second token generated external to the compute instance indicating that the compute instance is executing within the virtual network and is utilizing a network address that is known to have been previously used by or assigned to the compute instance.

12. The computer-implemented method of claim 4, wherein determining that the virtual network security condition of the policy statement is not satisfied comprises:
   determining which virtual network of a plurality of virtual networks the compute instance operates within;
   obtaining a policy comprising the policy statement;
   obtaining data from within the service provider system indicating the security posture of the virtual network; and
   comparing the obtained data from within the service provider system with a value indicated within the virtual network security condition, the value being specified by the user.

13. The computer-implemented method of claim 4, further comprising:
   before the receiving of the request to access the data:
      receiving, from the compute instance, a request for a list of security posture tokens that are to be provided to gain access to the data; and
      sending, to the compute instance, the list of security posture tokens.

14. The computer-implemented method of claim 4, further comprising:
   receiving, at an Application Programming Interface (API) endpoint of the service provider system, a request to enforce a policy including the virtual network security condition; and
   applying the policy within the service provider system.

15. The computer-implemented method of claim 4, further comprising:
   receiving, from a second compute instance in a second virtual network implemented within the service provider system, a second request to access a second data;
   determining that a second virtual network security condition of a second policy statement is satisfied, the second policy statement being configured by a second user for use in controlling access to the second data, the second virtual network security condition defining a condition of the second virtual network that is to be met; and
   throttling the second request in response to the determining that the second virtual network security condition of the policy statement is satisfied.

16. The method of claim 4, wherein the virtual network security condition requires at least one of:
   a particular security status of an account of the user being maintained for a predefined amount of time;
   the compute instance not having a particular network port open;
   a remote connection not being allowed into or out of the compute instance;
   one or more security-related settings of the compute instance or the virtual network being enabled;
   the compute instance and/or the virtual network being locked and/or unmodifiable;
   a security service assigning the compute instance and/or the virtual network a particular security score;
   a client of the compute instance using a source network address known to be assigned or utilized by the user;
   the security service currently enabled to monitor the compute instance and/or the virtual network;
   the virtual network security condition being true for at least a threshold amount of time prior to the request;
   no other compute instances existing within the virtual network;
   the compute instance and/or the virtual network only being allowed to access a desired data service associated with the data;
   the compute instance and/or the virtual network not being allowed to access any other entities inside or outside of the service provider system;
   no blacklisted or vulnerable code and/or packages existing in the compute instance and/or the virtual network;
   no blacklisted software running on the compute instance and/or the virtual network;
   the compute instance and/or the virtual network being created within a threshold amount of time from a time of the request;
   no other users and/or groups having a particular access privilege to the compute instance and/or the virtual network; or
   no current or previous open connections by the virtual network to other extra-virtual network endpoints.

17. A system comprising:
   one or more electronic devices of a service provider system for implementing:
      a compute instance operating in a virtual network; and
      a policy enforcement service to control access to data that is outside of the virtual network, the policy enforcement service to:
         receive a request to access the data, the request being originated by the compute instance, wherein the request includes a token that was generated outside of the virtual network that indicates a security posture of the virtual network, the token being identified by the policy enforcement service to the compute instance and obtained by the compute instance;
         determine whether the token has been altered since the token was generated outside of the network;
         determine that a virtual network security condition of a policy statement is not satisfied, the policy statement being configured by a user for use in controlling access to the data, the virtual network security condition defining a condition of the virtual network that is to be met, wherein the determination is based at least in part on a token that was generated outside of the virtual network that identifies a security posture of the virtual network; and
         perform one or more security actions responsive to the determination that the virtual network security condition of the policy statement is not satisfied.

18. The system of claim 17, wherein:
   to determine whether the token has been altered since the token was generated outside of the network, the policy enforcement service determines whether the request includes a valid signature for the token.

19. The system of claim 18, wherein the token indicates at least one of:
   whether the compute instance is or was able to send traffic to or receive traffic from the internet;

whether the compute instance is or was able to send traffic to or receive traffic from other endpoints outside of the virtual network but within the service provider system;

whether other compute instances exist or existed within the virtual network; or whether any vulnerable code exists or existed within the compute instance or virtual network.

20. The system of claim 18, wherein the token indicates at least one of:

a first security score for the virtual network indicating a level of adherence, by the virtual network, to a first set of one or more security practices;

a second security score for the compute instance indicating a level of adherence, by the compute instance, to a second set of one or more security practices; or an amount of time that the first security score for the virtual network has met or exceeded a threshold.

* * * * *